United States Patent Office 3,840,483
Patented Oct. 8, 1974

3,840,483
WATER-DILUTABLE COATING COMPOSITIONS AND LACQUER BINDERS
Rolf Guldenpfennig, Bammental, West Germany, assignor to Reichhold-Albert-Chemie Aktiengesellschaft, Hamburg, West Germany
No Drawing. Continuation-in-part of application Ser. No. 132,175, Apr. 7, 1971, which is a continuation-in-part of application Ser. No. 532,866, Mar. 6, 1966, both now abandoned. This application Aug. 21, 1972, Ser. No. 282,474
Claims priority, application Germany, Mar. 13, 1965, R 40,108
Int. Cl. C08g 30/12, 45/08, 45/10
U.S. Cl. 260—19 EP
15 Claims

ABSTRACT OF THE DISCLOSURE

A water dilutable heat-curable coating composition comprising:

I. a hydrophilic plasticizing epoxy resin partial ester containing free carboxyl groups and free hydroxyl groups which is obtained by partial esterification of epoxy compounds with hydrolyzed adducts of unsaturated mono- and poly-carboxylic acids and their possible anhydrides,
II. strong nitrogenous bases to form soaps with the free carboxyl groups,
III. water, and
IV. hydrophilic to water-soluble low molecular aldehyde condensation products such as phenol resols and/or aminoplasts.

The coating compositions of the present invention find particular utility either alone or mixed with pigments and/or fillers in primers, single layer coatings or top coatings, which can be applied by usual methods and especially by electrophoretic deposition.

CROSS-REFERENCES TO RELATED APPLICATIONS

This is a continuation-in-part of application Ser. No. 132,175, filed in the U.S. Patent Office on Apr. 7, 1971, and now abandoned, which application was a continuation-in-part of application Ser. No. 532,866, filed Mar. 6, 1966, in the U.S. Patent Office, now abandoned.

Applicant claims priority of Application No. R 40,108, filed Mar. 13, 1965, in the Patent Office of the Federal Republic of Germany.

BACKGROUND OF THE INVENTION

1. Field of the invention

It is an object of this invention to provide improved coating compositions having as binders water-dilutable synthetic resins containing epoxy resin partial esters with free carboxyl and hydroxyl groups.

Coating compositions and lacquer binders on the basis of epoxy resin esters, combined with phenol and/or melamine resins, have proved themselves useful in paints when dissolved as binders in water-miscible organic solvents, especially for primers, which are water-soluble and have advantages not known heretofore.

2. Prior Art

The U.S. Pat. No. 3,355,401 (Tanner) and the French Pat. No. 1,388,543 (Tanner) claim a process for the manufacture of water-thinnable coating compositions which comprises condensing a glycidyl polyether with a combination of at least two acidic materials one being a monobasic fatty acid and the other being a dimerized fatty acid. As is shown by the specification of the U.S.

Patent, polybasic fatty acids also include tribasic fatty acids, for instance the commercial acids and mixtures with the general formula:

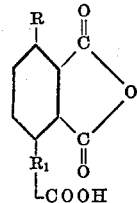

R representing a pentyl or hexyl group and R' the radicals —(CH$_2$)$_7$— or —CH$_2$)$_8$—.
In Example 4 of the U.S. Pat. 3,355,401, a tribasic fatty acid of the general formula

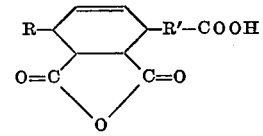

is mentioned, R being a pentyl or hexyl group and R' a polymethylene chain with 7 or 8 carbon atoms. The commercial product of the given formula mentioned is "Admerginat A 1." Admerginat® is trademark for maleic acid anhydride adducts of isomergin acids or Isomerginant respectively and corresponds to the given formula. (See the firm's print "Admerginate der Harburger Fettchemie Brinckmann & Mergell GmbH). Isomergin acids® is a trademark for isomerized fatty acids and Isomerginat® is a trademark for isomerized fatty acid methyl esters (see: F. Weghorst, J. Baltes, Fette. Seifen. Anstrichmittel 67, 447–449, 1965).

Furthermore, it is stated in the French Patent Specification 1,388,543 that the amounts of mono- and polybasic fatty acids, expressed in chemical equivalent weights, could be below, above, or equal to, those corresponding to the equivalent weight of the epoxy resin. In this case, the equivalent weight of the epoxy resin is defined as weight in grams of the resin, which is required to completely esterify one mol of a monobasic acid. It is furthermore stated that the esterification with the polybasic fatty acids preferably takes place following the esterification with the monobasic fatty acids, especially when tribasic acids are employed.

It has now been ascertained, when accomplishing the example No. 4 of the U.S. Pat. 3,355,401 and when producing other resins according to Claim No. 1, that in most cases the gelling of the preparation took place during the warming time with the tribasic fatty acids of the general formula given, especially when epoxy resins with low equivalent weight having many epoxy groups were applied and the percentage of monobasic fatty acids was about the same or lower than the percentage of the tribasic carboxylic acids used.

This result agrees with the statement made in the Belgian Patent Specification No. 637,097, where especially on page 12 it is stated that only adducts of fumaric acid to fatty acids of drying or semi-drying oils are suitable for the conversion with epoxy resins, while adducts of alpha, beta-ethylenically unsaturated dicarboxylic acids, which can form anhydrides, are too likely to form anhydrides on fatty acids of drying or semi-drying oils, being thus unsuitable, as anhydrides are agents for the polymerization of epoxy resins.

For esterification in the second stage Tanner uses a polybasic acidic material. By characterizing this acidic material he does not differentiate between adducts of dibasic acid or an acid anhydride and a fatty acid. Since acid anhydrides are known curing agents of epoxy resins, crosslinking should occur when these anhydride fatty acid adducts are used for esterification of the epoxy resin. However, when a dibasic unsaturated acid is employed for the production of the adduct, the formation of the acid anhydride during this reaction can also not be avoided. According to U.S. Pat. 2,033,131, page 2, column 2 lines 24 to 41, the adduct formation works with reasonable speed only at a temperature where the employed maleic acid converts to its anhydride and the obtained adduct therefore contains anhydride groups even when the acid is used as starting material.

The examples of this invention show that the process of this invention is carried out with the use of maleic anhydride which is being hydrolyzed after adduct formation with the natural fatty acid so as to avoid undesired side reactions during esterification with the epoxy resin. For the above-mentioned reasons the contents of free maleic acid in the finished adduct has also to be kept as low as possible before esterifying the epoxy resin. The examples of this invention theretofore state the amount of free unreacted maleic acid in the adduct to be below 3% by weight.

Carrying out the process of U.S. Pat. 3,355,401 (Tanner) is very critical since three out of five reaction mixtures gel after 30 to 60 minutes reaction time in the second stage. The gelling starts long before complete esterification of the epoxy resin took place and before the esterified product became water-soluble. After complete esterification the obtained product is highly viscous and is practically not capable of being pumped into technical installations for electrophoretic deposition. If one succeeds in electrocoating by use of this product the thickness of the achieved layers is too small to secure corrosion resistive properties as can be seen in the comparison test 3 and 5 in the specification of this invention.

The U.S. Pat. No. 3,305,501 (Spalding) claims a process for the preparation of water-soluble epoxy esters which comprises reacting an unsaturated fatty acid and fumaric acid to form an adduct and subsequently esterifying a glycidyl polyether using this adduct. Spalding has recognized the difficulties that arise from the use of acid anhydrides for the adduct formation (column 4, lines 14 to 21) and therefore uses an acid which does not form an anhydride.

The textbook for organic chemistry, Hans Beyer, S. Hirzel Verlag Leipzig, 1968, 15th edition, states on page 268 that by heating to about 300° C. fumaric acid converts to maleic acid which forms maleic anhydride immediately. By this citation an explanation might be given for the fact that the reaction mixture of the above fumaric acid/fatty acid adduct often also gels during esterification with the glycidyl polyether.

In the German Displayed Specification 1,443,712 Spalding himself shows in comparison test A, column 9, that the reaction mixture might gel when fumaric acid is reacted with the glycidyl ether of linseed-oil acid ester. The Spalding coating compositions have been tested by way of comparison tests in the specification of this invention. Relatively high viscous products are obtained and the use of such adducts results in gelling in combination with systems having many epoxide groups. Using the instructions given in the examples by Spalding coatings are obtained that do not have such highly valuable properties after application and stoving because of their relatively high content of non-reacted fatty acids. In column 2, lines 58–63, there is said that also adducts of fumaric acid and fatty acid in the molar ratio 1:1 can be used for producing the composition of the invention. As is shown in Comparison Test 7 of this invention no resins can be produced using this molar ratio because the composition gelatinizes. As is shown in Comparison Test 6 the epoxy resin partial ester of the U.S. Pat. 3,305,501 gives coatings that do not have such good corrosion resistance as the coatings of this invention have.

In order to avoid gelling of the reaction mixture during esterification Spalding did employ a non-anhydride forming acid but he did not suggest using the more readily available maleic acid or maleic anhydride and hydrolyzing the adduct before esterification takes place. For this reason the present invention fills a technological gap in the field of producing water-dilutable coating compositions suitable especially for electrodeposition.

The U.S. Pat. 3,308,077 (Pattison) disclosed an aqueous coating composition containing a salt of a resinous ester obtained by partially esterifying a polyol with a drying oil fatty acid and thereafter esterifying at least part of the unesterified hydroxyl groups of the polyol with maleinized fatty acid and neutralizing the resultant resinous ester with a volatile base. According to Pattison (see column 4, last line up to column 5, line 1) the adduct is prepared "by heating an equimolecular mixture of maleic anhydride and tall oil fatty acid at 400° F. for 3.5 hours." This means that about 5% of maleic anhydride and 5% of unsaturated fatty acid are present in the adduct in unreacted form (see comparison test 8). The use of the adducts according to Pattison leads to resins which after neutralization and dilution result in films having uneven surfaces and crater formations after electrophoretic deposition on account of the presence of free maleic anhydride, which builds up in the bath. This is shown in comparison test 2 of the present invention.

The U.S. Pat. 3,409,581 (Hagan) discloses a composition comprising a resole phenol-aldehyde condensation product and a thermoplastic polyhydroxy ether reaction product of a polynuclear dihydric phenol and epichlorohydrin.

The accordingly obtained composition is not water soluble and the thermoplastic reaction product consists of an epoxy resin not being esterified and containing no carboxylic groups as the epoxy resin of this invention does.

The U.S. Pat. 2,681,894 (Hoenel) describes a composition of matter being water soluble at least in the presence of a subordinate proportion of water miscible organic solvent comprising a low molecular methylol compound, a plasticizing alkyd resin and a water soluble base.

The plasticizing alkyd resin of the above invention is built up of different polyols but no epoxy compounds are used for the composition.

Besides the accordingly obtained films do not have an adequate corrosion resistance after stoving and therefore do not fulfill the requirements of useful coatings and they also can not be employed for the electrophoretic deposition.

SUMMARY

This invention relates to water dilutable heat curable coating compositions comprising the following components:

I. hydrophilic plasticizing epoxy resin partial esters selected from the group consisting of:
(1) the partial esters of glycidyl ethers of bisphenol A, containing epoxy groups or hydroxyl groups produced by hydrolytic cleavage of said epoxy groups, with at least one monocarboxylic acid and a polybasic carboxylic acid,
(2) the partial esters of glycidyl ethers of bisphenol A, containing epoxy groups or hydroxyl groups produced by hydrolytic cleavage of said epoxy groups, with a polybasic carboxylic acid, and
(3) a mixture of (1) and (2),
wherein said polybasic carboxylic acid comprises a hydrolyzed adduct, or a mixture of such adducts, of maleic acid or maleic anhydride with a fatty acid in the molar proportion of 1:0.9 to 1:1.1, said fatty acid is selected from the group consisting of natural drying oil acids and semi-drying oil acids, dehydrated castor oil fatty acids, tall oil fatty acids and their mixtures, said fatty acid mixtures containing unsaturated monocarboxylic acids, said polybasic carboxylic acids contain no more than 3% by weight of free maleic acid, and in forming said partial esters the molar proportion of free hydroxyl groups of the glycidyl ether to free carboxyl groups of the carboxylic acid is between 1:1 and 1:1.4, wherein one epoxy group is calculated as two hydroxyl groups, II. strong nitrogen bases forming soaps with the said hydrophilic plasticizing epoxy resin partial esters, III. water, and IV. 1 to 50% by weight of total solids content of water soluble or at least hydrophilic, thermosetting aldehyde condensation product of low molecular weight selected from the group consisting of phenol resols, aminoplasts and their mixtures.

These water dilutable coating compositions or lacquer binders contain 1 to 50% by weight of solids content of thermosetting, water soluble or at least hydrophilic low molecular aldehyde condensation products, such as phenol resols and/or aminoplast-forming resins.

The lacquer binders according to the invention are suitable to produce predominantly oven-drying lacquers which provide high-quality coatings not only when the customary application methods are used, such as spraying, dipping, pouring or the like, but also and especially when applied electrophoretically as precipitable lacquer binders from an aqueous bath having a solids content of 5 to 30% by weight of resin.

By water dilutable coating compositions such products are meant which are soluble or dispersible in water alone or at least with the addition of a minor amount of organic solvents that are largely or completely miscible with water, such as mono- and diethers of ethylene glycol or diethylene glycol with low monovalent alcohols such as methanol, ethanol, propanol, butanol, as for example methyl glycol, ethyl glycol, propyl glycol, isopropyl glycol, n-butyl glycol, diethyl glycol diethyl ether, also diacetone alcohol, low ketones such as acetone, methyl ethyl ketone, methyl isobutyl ketone, colloidal solution are preferred.

As compounds containing epoxy groups or possibly hydroxyl groups, the following may be considered: epoxidized olefins, diolefins and oligo-olefins, such as 1,2,5,6-diepoxy hexane and 1,2,4,5-diepoxy hexane, epoxidized, olefinically or diolefinically unsaturated carboxylic acid esters with mono- or polyvalent alcohols, as for example diepoxy stearic acid ester or monoepoxy stearic esters of methanol, ethanol, propanol and n-butanol, including their isomers, bis-(diepoxystearic acid)- and/or bis-(mono-epoxy stearic acid)-ester of polyvalent alcohols as for example ethylene glycol, 1,2- or 1,3-propylene glycol, 1,2-, 2,3-, 1,4-butylene glycol, neopentyl glycol, 1,6-hexanediol, glycerol, trimethylol propane, trimethylol ethane, pentaerythritol, tri-(diepoxy stearic acid)- and/or tri-(mono epoxy stearic acid)-ester of glycerol, trimethylol propane, trimethylol ethane or pentaerythritol, tetra-(diepoxy stearic acid) and/or tetra-(mono epoxy stearic acid)-ester of pentaerythritol.

Furthermore the following should be considered: epoxidized unsaturated oils such as soy bean oil, safflower oil, dehydrated castor oil alone or in mixture, epoxidized compounds with several cyclohexyl residues, such as diethylene glycol bis-(3,4-epoxy cyclohexane carboxylate) and 3,4-epoxy cyclohexyl methyl-3,4-epoxy cyclohexane carboxylate and vinyl cyclohexane dioxide.

Especially suitable are polyesters with epoxy groups such polyesters being produced by reacting a dicarboxylic acid with epihalogenhydrin or dihalogenhydrin, such as epichlorohydrin, dichlorohydrin, or the like in the presence of alkali. Such polyesters can be derived from aliphatic dicarboxylic acids such as oxalic acid, amber acid, glutaric acid, adipic acid, pimelic acid, suberic acid, azelaic acid, sebacic acid or from aromatic dicarboxylic acids, such as phthalic acid, isophthalic acid, terephthalic acid, 2,6-naphthylenedicarboxylic acid, diphenyl-o,o'-dicarboxylic acid and ethylene glycol bis-(p-carboxyl phenyl) ether, alone or in mixture. They correspond essentially to the overall formula:

$$CH_2\underset{O}{-\!\!\!-\!\!\!-}CH-CH_2-(OOC-R_1-COO-CH_2-CHOH-CH_2-)_n-$$

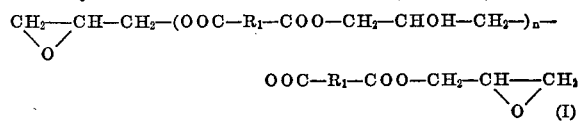

(I)

$R_1$ representing an aliphatic or aromatic radical and $n=0$ or a small number. The compounds of the above formula whose molecular weights do not surpass 3000, are well suited. Those with molecular weights of between 500 and 1000 are preferred.

Best suited are polyethers with epoxy groups such as those obtained by esterification of a bivalent alcohol or diphenol with epihalogenhydrin or dihalogenhydrin, e.g. with epichlorohydrin or dichlorohydrin in the presence of an alkali hydroxide. These compounds may be derived from glycols, such as ethylene glycol, diethylene glycol, triethylene glycol, propylene glycol-1,2, propylene glycol-1,3, butylene glycol-1,4-, pentane-diol-1,5, hexanediol-1,6 and especially from dihpenols such as resorcinol pyrocatechine, hydroquinone, 1,4-dihydroxy naphthalene, bis-(4-hydroxy phenyl)-methane, bis(4-hydroxy phenyl)-methyl phenyl methane, bis-(4-hydroxy phenyl)-tolyl methane, 4,4'-dihydroxy diphenyl and 2,2-bis(4-hydroxy phenyl)-propane.

The polyethers containing epoxy groups have the following general formula:

$$CH_2\underset{O}{-\!\!\!-\!\!\!-}CH-CH_2-(O-R_1-O-CH_2-CHOH-CH_2)_n-$$

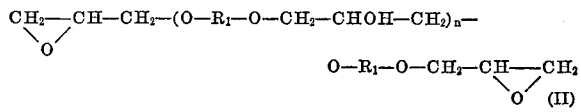

(II)

$R_1$ representing an aliphatic or aromatic radical and $n=0$ or a small number.

To be especially emphasized are polyethers containing epoxy groups of the general formula:

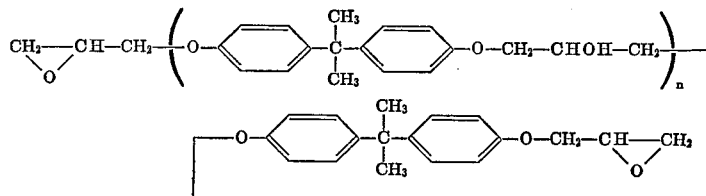

which contains 2,2-bis-(4-hydroxy phenyl)-propane as initial compound, of which preferably polyethers with molecular weights between about 380 and 3500 are employed.

The production of epoxy resin partial esters useful for this invention has been described in the British Patent 1,146,694.

For coating compounds electrophoretically precipitable those polyethers with a molecular weight of 380 to about 900 are preferably suitable. Those having a higher moleccular weight are also suitable and do provide corrosion resistant films, but it is more difficult to obtain thicker layers when depositing electrophoretically. For water dilutable coating compositions which are applied by customary methods, such as dipping, spraying, flooding, pouring or spreading, polyethers with higher molecular weights are preferred.

Furthermore, those polyglycidyl ethers derived from tri-and polyhydroxyl compounds can also be used, which ethers have two or more glycidyl radicals. Such may be trimethylol propane triglycidyl ether, trimethylol ethane triglycidyl ether, glycerol triglycidyl ether, pentaerythritol triglycidyl ether, pentaerythritol tetraglycidyl ether, pentaerythritol tetraglycidyl ether or polyglycidyl ether of esters of polyvalent alcohols with hydroxy acids, such as di- or triglycidyl ether of the triricinoleates or of castor oil respectively.

Among the polyglycidyl ethers, those which are obtained in a known manner (German Patents 1,184,496 and 1,138,542) by the reaction of lacquers based on phenol, cresol, xylenol, or bisphenols with epichlorohydrin are well suited. Other epoxides and/or epoxy resins with epoxy groups or epoxy groups and hydroxyl groups and with molecular weights of up to about 3000 have been described in large numbers in the book "Epoxydverbindungen und Epoxydharze" by A. M. Paquin, Springer-Verlay, 1958 Berlin, Göttingen, Heidelberg.

Reference should be made to the fact that the compounds mentioned can usually be also used when the epoxy groups have already been decomposed hydrolytically, i.e. that there are already di- or polyhydroxyl compounds present.

As monobasic carboxylic acids, aromatic and/or hydroaromatic and/or heterocyclic and/or aliphatically straight-chained and/or ramified chained, unsaturated and/or saturated aliphatic monocarboxylic acids are suitable. Importance should be given mainly to the group of the saturated and unsaturated aliphatic monocarboxylic acids.

As monobasic aliphatic carboxylic acids, the following are suitable: straight and/or ramified chained, saturated and/or unsaturated fatty acids with 1 to 40 carbon atoms, such as acetic acid, propionic acid, butyric acid, valeric acid, capronic acid, caprylic acid, iso-octanic acid, nonanic acid, isononanic acid, undecanic acid, lauric acid, myristic acid, palmitic acid, palmitoleic acid, petroselic acid, stearic acid, oleic acid, elaidic acid, 9,12-linoleic acid, 9,11-linoleic acid, (in the cis, cis-trans and trans-trans form), linoleic acid, elaeostearic acid, arachidonic acid, henic acid, lignoceric acid, euruca acid, arachidonic acid, clupanodonic acid, α-parinaric acid, α-licanic acid, or their anhydrides respectively, alone or in a mixture. Preferred fatty acid mixtures are those obtained from natural vegetable and animal fats, such as cottonseed oil, peanut oil, wood oil, corn oil, oiticica oil, olive oil, poppy seed oil, boleko oil, palm nut oil, olive seed oil, perilla oil, colza oil, coconut oil, sunflower oil, walnut oil grapeseed oil, sardine oil, herring oil, menhaden oil, trane oil, lard or beef suet, especially linseed oil, soy bean oil, coconut oil, and safflower oil. Furthermore technical fatty acids may be used, especially tall oil fatty acids, chemically treated fatty acids or fatty acids from chemically treated fats, especially dehydrated castor oil fatty acids, or fatty acids conjugated by catalytic processes. Fatty acids from catalytically conjugated fats, especially conjugated linseed oil, soy bean oil or safflower oil, fatty acids, fatty acids elaidinated by catalytic processes or fatty acids from elaidinated fats, hydrated or partially hydrated fatty acids or fatty acids from hydrated or partially hydrated fats, e.g. fish oils, as well as rosin acids, especially colophony or hydrated or partially hydrated rosin acids, especially hydrated or partially hydrated colophony or mixtures of such acids or acid mixtures of the above-named type with each other.

By monobasic carboxylic acids there should also be understood partial esters of polybasic carboxylic acids which contain one free carboxylic group only, such as monoesters of amber acid, glutaric acid, adipic acid, pimelic acid, suberic acid, azelaic acid, sebacic acid, especially partial esters of dimerized or oligomerized unsaturated fatty acids and/or partial esters of such "tricarboxylic acids" not exactly definable.

Bakeable coating compositions with excellent properties are obtained when phenol carboxylic acids condensable with formaldehyde are used alone or in a mixture with the previously named monobasic carboxylic acids. Among these, 4,4-bis-(4-hydroxy phenyl)-valeric acid has a special significance.

Furthermore, it has been found that instead of monobasic carboxylic acids, which are bonded to the epoxy resin by esterification, compounds containing monohydroxyl groups can be inserted by etherification, in the proportion in which epoxy groups are contained in the epoxy resin, i.e. one hydroxyl group can be bonded per epoxy group. As compounds containing hydroxyl groups, rosin alcohols and especially higher fatty alcohols are suitable, such as lauryl alcohol, myristyl alcohol, palmityl alcohol, stearyl alcohol, but also esters of hydroxy fatty acids, such as ricinoleic acid ester, hydroxy stearic acid ester.

By polybasic carboxylic acids are also meant partial esters of polycarboxylic acids, which, however, must still be polybasic carboxylic acids. Special consideration is to be given to partial esters of polybasic carboxylic acids with saturated straight chain aliphatic monoalcohols with 1 to 20 carbon atoms. Especially suitable among these are the partial esters of the above described, but not accurately definable "tricarboxylic acids" which are obtained by adduct formation of α,β-unsaturated dicarboxylic acids or their anhydrides with unsaturated fatty acids. Such partial esters can be obtained by:

(a) reacting α,β-unsaturated dicarboxylic acids or their anhydrides with esters of the above-named unsaturated fatty acids with preferably saturated straight chain aliphatic monoalcohols having 1 to 20 carbon atoms such as methanol, ethanol, propanol, butanol, pentanol, hexanol or the like, especially methanol, or by (b) partial esterification of the adduct, obtained by reacting α,β-unsaturated dicarboxylic acids or their anhydrides with free unsaturated fatty acids, with preferably saturated, straight chain aliphatic monoalcohols with 1 to 20 carbon atoms such as methanol, ethanol, propanol, butanol, pentanol, hexanol, and the like, especially methanol.

The polybasic carboxylic acids obtained by methods (a) and (b) are not identical. The water dilutable synthetic resins produced therefrom show different behaviors, e.g., in relation to their storage stability. They also show different behaviors in the process of the present invention. The polybasic carboxylic acids obtained by process (b) generally require a somewhat higher esterification temperature. The polybasic carboxylic acids obtained according to method (b) are preferred. These not exactly defined "tricarboxylic acids" containing no anhydride groups are obtained by hydrolyzing the adducts of anhydrides of α,β-ethylenically unsaturated dicarboxylic acids to unsaturated fatty acids. The hydrolyzing has also to be made if the above adducts are produced under conditions under which the formation of anhydrides can not be excluded. The hydrolysis can for example be carried out in that manner that the adduct containing anhydride groups is reacted with water at 100° C.

It is advisable to use 1 mol of water for each mol of dicarboxylic acid and additionally an excess of 1 mol of water. Hydrolysis is finished as soon as the acid number does not increase of more than 5 units per hour. Usually this can be reached by a reaction time of 2 hours at 100° C.

Contrary to the prevailing opinion that for the production of water soluble synthetic resins, adducts of α,β-ethylenically unsaturated dicarboxylic acids must be used with trans-trans isomerized fatty acids in order to avoid the formation of polymeric polybasic acids which would not be suitable for the production of water soluble synthetic resins (see R. V. Crawford, P. A. Toseland "Fette. Seifen. Anstrichmittel," 66, 1083 (1964), and "Farbe und Lack," 70 912 (1964)) it was not discovered unexpectedly that with exactly the adducts of such nonisomerized fatty acids from dehydrated castor oil, used in mixtures with other fatty acids for adduct formation, lower viscosities are obtained than with isomerized fatty acids.

The following examples of adducts demonstrate these advantageous properties:

Adduct 1: 30% castor oil fatty acid, 45% distilled tall oil fatty acid with a resin content of about 1% and 25% maleic acid anhydride, are converted into the adduct in a known manner by heating. After adduct formation there remained less than 3% of the original amount of maleic acid anhydride.

Adduct 2: 45% castor oil fatty acid, 30% distilled tall oil fatty acid with a resin content of less than 1% and 25% maleic acid anhydride are converted into the adduct in a known manner by heating. After adduct formation there remained less than 3% of the original amount of maleic anhydride.

Adduct 3: 75% nonbreaked safflower oil and 25% maleic acid anhydride are converted into the adduct in a known manner by heating. After adduct formation there remained less than 3% of the original amount of maleic acid anhydride.

Adduct 4: 75% light colored linseed oil and 25% maleic acid anhydride are converted into the adduct in a known manner by heating. After adduct formation there remained less than 3% of the original amount of maleic acid anhydride.

Adduct 5: 75% distilled tall oil fatty acid with a resin content of less than 1% and 25% maleic acid anhydride are converted into the adduct in a known manner by heating. After adduct formation there remained less than 1% of the original amount of maleic acid anhydride.

After their production the adducts were hydrolyzed with water at 100° C. for 2 hours. The reaction temperature in the adduct formation was 180° to 200° C.

TABLE I

| | Admerginat®, A hydrolyzed | Adduct (hydrolyzed) | | | | |
|---|---|---|---|---|---|---|
| | | 1 | 2 | 3 | 4 | 5 |
| Gardner-Holdt viscosity, 66.6% in butyl glycol. | T+ | G-H | G+ | F | H | F+ |

From these results can be followed that adducts made from natural fatty acids contain only partly products of the overall formula:

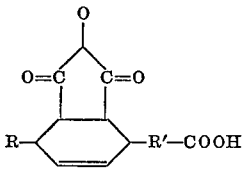

wherein R and R' mean alkyl radicals, and another part of these adducts may consist of succinic acid adducts which are formed according to "substituting addition" (Wagner-Sarx, "Lackkunstharze," 1959, Karl Hanser Verlag, page 87) and have a low molecular weight.

The mol or proportion of α,β-unstaurated carboxylic acids to unsaturated fatty acids may vary and naturally also depends on the type of fatty acids used. The adducts most preferred, however, are those with a proportion between 0.9:1 and 1.1:1.

By selecting and mixing suitable fatty acids the viscosity ranges of the adducts can be established, as can be seen from the present examples. Fatty acids which are readily polymerizable tend to produce highly viscous adducts while fatty acids of semidrying oils such as soybean or safflower oil produce adducts with low viscosity. Adducts with exceptionally high viscosity are obtained from isomerized and also from dimerized fatty acids so that these components in this invention are to be considered excluded. The viscosity can also be effected by the reaction time, the reaction temperature and the sequence of the reaction between the fatty acid and the α,β-ethylenically unsaturated dicarboxylic acid.

With binders for electrophoretic deposition the amount of free maleic acid anhydride after adduct formation must be less than 3% by weight. Preferably less than 1% by weight of the total amount added. The esterification reaction of the hydrolyzed adduct with the epoxy resin recation product, made of epoxy resins and monobasic fatty acids, or epoxy resins themselves is carried out more completely than the esterification reaction of the hydrolyzed adducts of isomerized fatty acids and maleic anhydride with the epoxy resins.

At the same time epoxy resin partial esters containing adducts of natural fatty acids show better water solubility. They also show a lighter color, while the adducts of natural fatty acids induce lower iodine color numbers.

As polybasic carboxylic acids, the following are suitable alone or in mixtures: di-, tri-, and polycarboxylic acids, e.g. oxalic acid, amber acids, glutyric acids, adipic acid, pimelic acid, suberic acid, azelaic acid, sebacic acid, maleic acid, fumaric acid, citraconic acid, mesaconic acid, itaconic acid, phthalic acid, isophthalic acid, terephthalic acid, tetra and hexahydrophthalic acid, trimellitic acid, pyromellitic acid, or their anhydrides if they exist.

Among the dicarboxylic acids, the polybasic acids obtained by dimerization or oligomerization of unsaturated fatty acids should be emphasized. Preferably converted are the "tricarboxylic acids" not exactly to be defined, those formed by addition of α,β-unsaturated dicarboxylic acids or their anhydrides respectively, if they can be formed, such as maleic acid to unsaturated fatty acids such as palmitoleic acid, petroselic acid, oleic acid, elaidic acid, cis-cis, cis-trans or trans-trans linoleic acid, cis-cis, cis-trans or trans-trans-9,11-linoleic acid, linoleic acid with isolated and conjugated double bonds, elaeostearic acid, euruca acid, clupanodonic acid, licanic acid, parinaric acid alone or in mixture. Use is made especially of mixtures of unsaturated fatty acids, as are obtained from natural vegetable and animal unsaturated fats by saponification, such as fatty acids from cotton seed oil, lupine oil, maize oil, colza oil, sesame oil, grape seed oil, wanut oil, perilla oil, linseed oil, wood oil, oiticica oil, especially soybean oil, poppy seed oil, sunflower oil, safflower oil. Especially suitable are furthermore unsaturated technical fatty acids, especially tall oil. Chemically treated fatty acids or fatty acids of chemically treated oils, especially fatty acids of dehydrated castor oil are suitable and also it is possible to employ conjugated and/or elaidinated fatty acids.

Furthermore, rosin acids, such as colophony or partially hydrated rosin acids are suitable as unsaturated acids, as a rule, however, only as additions to the fatty acids named of up to about 50% by weight. The fatty acids mentioned may be used alone or mixed with one another.

Adduct formation may also be effected with the oils, i.e. triglycerides. The saponification then takes place subsequently. It is also possible to catalyze the isomerization of the fatty acids during the formation of adducts.

By adding anti-oxidant agents, the risk of polymerization during the formation of adducts can be reduced. Relatively low viscosity oils are obtained. With additives, such as triphenyl phosphite, which affect the color favorably, clear adducts can be obtained, even when using raw material of lower quality.

The reaction with maleic anhydride has to be continued for so long until the content of free maleic acid lies below 3% by weight, preferably below 1% by weight for the electrophoretic coating process.

Employing the hydrolyzed adducts guarantees that during the reaction of the adduct with the epoxy resin or respectively, with the reaction product of the epoxy resin with a monocarboxylic acid no gelling occurs, especially when still a larger number of epoxy groups is present.

The production of the partial esters of epoxy groups, possibly compounds containing hydroxyl groups or such polyhydroxyl compounds as have been obtained by hydrolytic cleavage of compounds carrying epoxy groups, is effected with monobasic carboxylic acids by heating and, in case reaction water is formed, can be accelerated by adding azeotropic agents removing the reaction water, i.e. xylene, or by working at reduced pressure. It is recommended to remove the drying agent before the subsequent esterification with polybasic carboxylic acids. The esterification with the monobasic carboxylic acid is preferably continued until the acid number of the partial ester amounts to about nil.

Esterification is simplified by adding catalyzers such as anhydrous sodium carbonate which accelerates the cleavage of the epoxide groups. Resins of lower viscosity are thereby obtained.

When esterifying polybasic carboxylic acids with the thus obtained epoxy resin partial esters or with compounds containing epoxy groups, it should be observed that mixtures of polybasic carboxylic acids and monobasic carboxylic acids may have carboxyl groups of different reactivity. The partial esterification should then not take place simultaneously, but successively, so that the acids with less active carboxyl groups are the first to be esterified, usually at a raised temperature, and those acids having more active carboxyl groups are esterified subsequently, usually at lower temperatures.

The esterification always is effected at the lowest temperature possible so as to permit good control of the reaction.

The degree of esterification is preferably controlled to such extent that the polybasic carboxylic acid is bonded to the epoxy resin or the polyhydroxyl compound by about one carboxyl group. The small percentage of non-reacted polybasic carboxylic acid possibly remaining in the reaction product is generally of no importance.

The proportion of epoxy groups or of hydroxyl groups of polyhydroxyl compounds or of such hydroxyl groups obtained by hydrolytic cleavage of epoxy groups respectively, to carboxyl groups of mono- and polybasic carboxylic acids (component I, method 1) or of polybasic carboxylic acids alone (component I, method 2) may be varied over a wide range. The proportion is of course dependent on the nature of the polybasic carboxylic acids, of the epoxy compounds used, and also of the compounds carrying hydroxyl groups specified above.

Producing water-dilutable coating compositions based on bisphenol-A and epichlorohydrin according to the invention very good resins are obtained, when in the initial mixture the proportion of hydroxyl groups (one epoxy group is calculated as two hydroxyl groups, phenolic hydroxyl groups are disregarded) to carboxyl groups falls within the range of 1:0.8 to 1:2. A proportion in the range of 1:1 to 1:1.4 is preferred.

If a very high excess of carboxyl groups is chosen, so that the epoxy resin is nearly completely esterified, a subsequent etherification of the residual hydroxyl groups of the epoxy resin ester with mono- or polyvalent alcohols may be advantageous. As monovalent alcohols, methanol, ethanol, propanol, isopropanol, n-butanol, iso-butanol, sec.-butanol, pentanol, hexanol and the like may be used. As polyvalent alcohols, ethylene glycol, 1,2- and 1,3-propylene glycol, 1,2-, 1,3-, 2,3-, 1,4-butylene glycol, neopentyl glycol, glycerol, trimethylol propane, trimethylol ethane, pentaerythritol and the like are suitable.

The considerable rise in viscosity during the esterification reaction of high molecular epoxy resins and/or epoxy resin partial esters with polybasic carboxylic acids may possibly lead to difficulties in the production on an industrial scale. Solvents which are at least partially miscible with water are preferred, such as glycol or diglycol diether, ethylene glycol diethylether, diethylene glycol diethylether or also ketones, such as methyl isobutyl ketone. Such solvents usually need not be removed as they do not affect the water-dilutability of the resin. When using solvents not miscible with water, these will have to be removed before neutralization of the resin.

By choice of the carboxylic acids and their proportion, it is possible to control the properties of the resin concerning elasticity, hardness, corrosion resistance of the lacquer films produced therefrom, but also e.g. the amount of plasticization required when using the electrophoretic lacquering process. It has to be regarded mostly that the intermediate product has to be partially esterified with such amounts of polybasic carboxylic acids and in such a manner that the obtained epoxy resin partial esters are water-dilutable after being neutralized with ammonia and/or strong organic nitrogen bases; that means they still have to contain enough free carboxyl groups to ensure water-solubility.

In order to present production instructions on an industrial scale for the new epoxy resin partial esters of this invention a model procedure has to be worked out in the laboratory. Subsequently an 8 g. test part of the thus obtained artificial resin is diluted using 2 g. ethylene glycol and is stirred to get a homogeneous solution. To this solution ammonia or a strong organic nitrogen base is added until the pH-value of 8 is reached. Then the solution is diluted with water until it contains 10% by weight of the resin. This solution has to be water-dilutable and may not contain undissolved resin particles. This test condition has already been reached if the solution is milky turbid.

If the resin or part of it could not completely be dissolved, the model procedure has to be repeated using a correspondingly larger amount of hydrolyzed adduct as polybasic carboxylic acid.

The prescription thus worked out for the production of water-dilutable epoxy resin partial ester can then be carried out on an industrial scale without having to be repeated on a larger scale. Good results are obtained when the resulting products have acid numbers of between 50 and 150.

With low molecular epoxy resins containing large numbers of epoxy groups the reaction may proceed in such a manner that the aqueous solution will gel after some time, although the reaction products with polybasic acids are indeed water-soluble after the neutralization. This property is generally not desired. In order to obtain a sufficient storage stability, the reaction should be prolonged until the number of the still existing epoxy groups has become negligibly small. The most stable composition is obtained when the epoxy resin partial ester does not contain any residual epoxy groups at all.

The production method (2) of component I—partial esterification of the epoxy compound with monocarboxylic acids and subsequent reaction with polybasic carboxylic acids to acidic epoxy resin partial esters—has the great advantage that the film-forming carbon double bonds are fully conserved, when using unsaturated fatty acids as monocarboxylic compound.

Drying of the film may be accelerated by adding known catalysts, so-called driers.

As component II for the neutralization of the acid esters, aqueous ammonia solutions or strong organic nitrogen bases are suitable, the 10% strength aqueous solution of which showing a pH-value of >8 at 25° C., such as triethylamine, diethylamine, trimethylamine, piperidine, morpholine, and the like, especially suitable are alkylol amines, such as dimethyl ethanolamine, diethanolamine, triethanolamine, especially diisopropanol amine, also polyamines, such as ethylene diamine, diethylene triamine and triethylene tetramine, which are generally used only in mixtures with monoamines. It is not necessarily required to use the theoretically calculated amount of neutralizing agents for the neutralization. Frequently sufficent water-solubility is already obtained with a smaller amount. Strong volatile tertiary organic nitrogen bases, such as triethylamine and dimethyl ethanolamine are preferably used.

Combining the epoxy esters with relatively low molecular, at least hydrophilic, thermo-setting condensation products IV, such as reaction products IVb and/or phenol resols IVa, causes a higher network of the coating compounds baked and thus a further improvement of their technical laquer properties, such as hardness, gloss, corrosion resistance and the like.

In the preferred embodiment the phenol resols are used alone.

Those condensation products, which reach a relatively high molecular but still not unmeltable condition when being heated alone, should also be thermosetting. It is also not absolutely necessary that the condensation products are water-soluble by themselves; it is only necessary that their hydrophilic character should suffice to provide a sufficient compatibility in combination with the plasticizing component I, and components II and III, i.e. that the baked films should be clear and homogeneous and that in the aqueous coatings there should not be any coagulation of the binder.

Thermo-setting, hydrophilic, low-molecular condensation products forming aminoplasts are also aldehyde reaction products of compounds reactable with aldehydes, such as urea, ethylene urea, dicyanide diamine and aminotriazine, such as melamine, benzguanamine, acetguanamine and formguanamine. The above mentioned compounds can be reacted with aldehydes, such as formaldehyde, acetaldehyde, crotonaldehyde, acroleine, benzaldehyde, furfural and the like. By aldehydes should also be understood aldehyde donating compounds such as paraformaldehyde, paraldehyde and trioxymethylene. A preferred aldehyde is formaldehyde. The preferred aldehyde binding compounds are melamine and urea. The reaction is effected in the usual molar-proportions, i.e. with urea resins in a usual formaldehyde molar-proportion of 1:1.5 to 1:4, with melamine resins in a formaldehyde molar-proportion of 1:1.5 to 1:6. The nitrogen containing condensation products are preferably applied in partially or completely alkylated or alcohol modified form.

The etherification products of the lowest semi-ethers of glycol and diglycol, such as ethylene glycol, ethylene diglycol with the methylol melamines, which have already been disclosed in the Austrian Patent 180,407, have also proved advantageous in the present case.

Preference is also given to low molecular condensation products of melamine with formaldehyde with a melamine formaldehyde proportion of 1:4 to 1:6, which has been etherified with methanol. Also suitable are ethers of nitrogenous polymethylol compounds which have been partially esterified with dicarboxylic acids, such as are obtained e.g. by reaction of hexamethoxymethyl melamine with adipic acid. Such condensation products may be contained in the baking varnish of this invention in amounts of 5 to 50 percent by weight. Combinations of the components I, II, III and IV, containing the aminoplast-forming condensation product with 5 to 25% by weight, are preferred. The percentages given refer to solids content.

Examples of suitable thermo-setting, hydrophilic, low-molecular condensation products are phenol alcohols and phenol polyalcohols, i.e. still low-molecular by condensation of mono and/or polynuclear phenols with aldehydes, such as formaldehyde, acetaldehyde, crotonaldehyde, acrolein, benzaldehyde, furfural and the like, or formaldehyde donating compounds, such as paraformaldehyde, paraldehyde, trioxymethylene—the preferred aldehyde is formaldehyde or a formaldehyde donating compound—which are obtained in the known way in the alkaline medium. The following phenols are suitable: phenol, phenol substituted in o-, o'- and p-position, but still condensable with formaldehyde, such as cresol, xylenol. Especially well-suitable are resols obtained from alkyl phenols, such as n-propyl, n-butyl and especially p-tert.butyl phenol. Furthermore, resols of binuclear phenols, such as diphenol, bisphenol-A are suitable, especially those containing 1.75 to 2.5 mols formaldehyde per mol phenol. When applying the resols, it is recommended to use also a small amount of a strongly hydrophilic solvent, such as ethylglycol, diethyl glycol, propyl glycol, isopropyl glycol, n-butyl glycol.

Resols of phenol carboxylic acids are preferably used, which are obtained by condensation of formaldehyde or formaldehyde donating compounds with suitable phenol carboxylic acids. Among the phenol carboxylic acids condensable with formaldehyde the 4,4 - bis-(4-hydroxyphenyl)-valeric acid occupies a preferred position. Here too, the most advantageous results are obtained when 1.75 to 2.5 mols formaldehyde are combined per mol of diphenol acid. It is recommended to neutralize the phenol carboxylic acid resols preferably with ammonia before mixing with the plasticizing component I, respectively. The production of other suitable phenol carboxylic acid resols is described e.g. in the German Displayed Patent Specification No. 1,113,775. Phenol carboxylic acid resols, especially those based on 4,4-bis-(4-hydroxyphenyl)-valeric acid, are eminently suitable for the compositions, which are destined for the application, according to the invention, as electrophoretically depositable coatings and lacquer binders. In the coatings and lacquer binders according to the invention, the percentage of hydrophilic phenol resols and/or phenol carboxylic acid resols can amount from 0 to 50% by weight, those combinations are preferred which contain 5 to 25% by weight of the phenol resols and/or phenol carboxylic acid resols.

Without further elaboration, it is believed that one skilled in the art can, using the preceding description, utilize the present invention to its fullest extent. The aforesaid preferred specific embodiments are, therefore, to be construed as merely illustrative, and not limitative of the remainder of the specification and claims in any way whatsoever.

(A) EXAMPLES FOR THE PRODUCTION OF COMPONENTS I ("Parts" always refer to parts by weight)

Production of (preliminary product a): 45 parts dehydrated castor oil fatty acids, 30 parts tall oil fatty acid, and 25 parts maleic acid anhydride are brought to reaction in the known manner in a flask with agitator and cooler under inert gas at 180 to 220° C., until no more than 3% of the amount of maleic acid anhydride used are free. Hydrolyzation is then effected by adding 5 parts water and by maintaining the product at 100° C. for two hours. The product then has an acid number of 310–340.

Production of epoxy resin partial ester 1: 600 parts of an epoxy resin obtained by reacting bisphenol-A with epichlorohydrin in the presence of alkali, having a melting point of 64 to 76° C., an epoxy equivalent weight of 450 to 525 and a molecular weight of about 900 are reacted in a suitable reaction container equipped with an agitator, a cooler and thermometer, with 740 parts of preliminary product a. The acid number of the mixture is then determined, and the mix is maintained at about 120° C. until the acid number has fallen by about ⅓. As soon as this acid number has been reached, 140 parts n-butyl glycol and 150 parts ethyl glycol are added.

Production of epoxy resin partial ester 2: 300 parts of an epoxy resin, obtained by reacting bisphenol-A with epichlorohydrin in the presence of alkali, having a melting point of 20 to 28° C., an epoxy equivalent weight of 225 to 290 and a molecular weight of about 470 are esterified in a suitable reaction container equipped with an agitator, a cooler and thermometer, with 330 parts linseed oil fatty acids to an acid number of below 2. As soon as this value has been reached, the mixture is cooled to about 100° C. and 300 parts preliminary product a are added. After short agitation, the acid number is determined and a temperature of 100 to 145° C. is then maintained until the acid number has fallen by about ⅓.

Production of epoxy resin partial ester 3: 450 parts of an epoxy resin, obtained by reacting bisphenol-A with epichlorohydrin in the presence of alkali, having a melting point of 64 to 76° C., an epoxy equivalent weight of 450 to 525 and a molecular weight of about 900 are esterified in a suitable reaction container with 230 parts tall oil fatty acid at 180° C. in the presence of 0.5 part anhydrous sodium carbonate to an acid number of below 2. The reaction product is cooled and then mixed at about 100° C. with 440 parts preliminary product a. A temperature of 140 to 150° C. is then maintained, until the acid number has sunk by about 30 to 35 units.

Production of epoxy resin partial ester 4: 350 parts of an epoxy resin, obtained by reacting bisphenol-A with epichlorohydrin in the presence of alkali, having a melting point of 95 to 105° C., an epoxy equivalent weight of 870 to 1025 and a molecular weight of about 1400, are esterified in a suitable reaction container with agitator, cooler and thermometer with 300 parts linseed oil fatty acid under inert gas at 220 to 230° C. in the presence of 0.3 part anhydrous sodium carbonate to an acid number below 2. It is then cooled and 400 parts of the preliminary product a are added at below 150° C. Immediately after the reaction the acid number is determined. The mix is then maintained at 145° C. until the acid number has fallen by nearly ⅓. After the reaction is finished, the mixture is diluted with 16% by weight of n-butyl glycol.

Production of epoxy resin partial ester 5: 500 parts of an epoxy resin, obtained from bisphenol-A with epichlorohydrin in the presence of alkali, having a melting point of 125 to 132° C., an epoxy equivalent weight of 1650 to 2050 and a molecular weight of about 2900 are esterified in the above reaction container with 430 parts linseed oil fatty acid to an acid number of below 2. The esterification is carried out in the presence of 0.45 part anhydrous sodium carbonate in the xylene cycle. After the finished esterification the xylene is distilled off in vacuo and the resin is diluted with ethyl glycol acetate to a solids content of about 75% by weight. At about 100 to 110° C., the epoxy resin partial ester is reacted with 570 parts of preliminary product a, until the viscosity, measured 50% by weight in n-butyl glycol, amounts to A (Gardner Viscosity Scale). It is then diluted with ethyl glycol to a solids content of about 70% by weight.

(B) EXAMPLES FOR THE COMPONENT IVa, THERMO-SETTING HYDROPHILIC ALDEHYDE CONDENSATION PRODUCTS

Production of phenol resol 1: 60 parts p-tert.-butyl phenol and 80 parts aqueous formaldehyde solution (30% by weight) are reacted under the action of strong lyes at about 40° C. until the content of free formaldehyde has fallen to about nil. Using strong acids, the resol salt is decomposed and washed free of salts with water.

Production of phenol carboxylic acid resol 2: 350 parts 4,4-bis-(4-hydroxyphenyl)-valeric acid and 270 parts aqueous formaldehyde solution (30% by weight) are reacted under the action of strong lyes at about 40° C. until 1.8 to 2 mols formaldehyde are combined per mol of diphenol acid. With strong acids, the resol salt is decomposed and washed with water to be salt-free. The washed phenol resol is neutralized with aqueous ammonia solution until the pH-value of the 20% by weight aqueous solution amounts to about 8.

Production of phenol carboxylic acids resol 3: 228 g. diphenylol propane, 1 mol soda lye and ½ litre water are mixed and the phenolate solution is reacted at about 80 to 90° C. with a solution of 110 g. sodium chloracetate in 170 g. of water.

The percentage of an average sample liberated from alkali by acidulation and soluble in a mixture of toluene and n-butanol shows by the acid number that about 85% by weight of the bisphenol have been transformed, while the rest has remained free.

After the separation from the salt-containing aqueous layer, the mass is reacted with 200 g. aqueous formaldehyde (35% by weight) at a moderately increased temperature in the known manner, under the action of strong lyes. With the aid of strong acids, the phenol carboxylic acid resol salt is decomposed, washed with water until salt-free and neutralized with an aqueous ammonia solution.

(C) EXAMPLE FOR THE PRODUCTION OF A COMPONENT IVb OF THE AMINOPLAST-FORMING CONDENSATION PRODUCT 4

126 parts of melamine are reacted in the known manner with 480 parts of a 44% strength by weight aqueous formaldehyde solution in a slightly alkaline buffered solution (pH-value about 8) at about 60° C. The reaction product obtained, essentially hexamethylol melamine, is then etherified with a methanol surplus in a muriatic acid solution at about 40 to 50° C. The etherification product is neutralized with soda lye, the salts are separated and the mixture is liberated from water and excess methanol by vacuum distillation. The product obtained has a very low content of free formaldehyde.

EXAMPLES ACCORDING TO THE INVENTION

Example 1

800 parts epoxy resin partial ester 2 are diluted with 160 parts ethyl glycol and 800 parts water, to which trimethylamine is added until the pH-value of a 20% by weight aqueous solution amounts to 8. 360 parts phenol carboxylic acid resol 2 (solids content 56% by weight) are added to the solution.

Example 2

800 parts epoxy resin partial ester 5 are diluted with 600 parts water, to which triethylamine is added, until the pH-value of a 20% by weight aqueous solution amounts to 8 to 9. 220 parts phenol resol 1 (solids content 64% by weight) are then added to this solution.

Example 3

800 parts epoxy resin partial ester 3 are diluted with 160 parts n-butyl glycol acetate and 800 parts water and triethylamine are added to this until the pH-value of a 20% by weight aqueous solution amounts to between 7, 5 and 9.

This solution is mixed with 220 parts of a melamine resin (50% by weight solids content) which has been produced in the known manner according the German Displayed Patent Application 1,113,774.

Example 4

121 parts epoxy resin partial ester 4 are diluted with 900 parts water and dimethylethanol amine is added thereto until the pH-value of a 20% by weight aqueous solution amounts to about 8. The solution is then mixed with 250 parts of the aminoplast-forming condensation product 4.

A bath solution suitable for electrophoretic lacquering is produced e.g. as follows: 10 kg. of a 40% by weight solution of the resin according to Examples 1 to 3 are ground with 2 kg. iron oxide red in a ball mill and diluted with distilled water to a solids content of about 20 to 10% by weight. For the electrophoretic coating, the metallic body is dipped into the bath as anode. When using a continuous voltage of about 100 v., the body is uniformly coated with the resin produced according to the invention. By adding limited amounts of suitable organic solvents miscible with water, e.g. ethyl glycol, n-butyl glycol, the thickness of the layer deposited may be increased. By baking at 170 to 190° C. (30 to 20 minutes) a highly corrosion resistant coating is obtained.

Example 5

122 parts epoxy resin partial ester 1 are mixed with 200 parts distilled water and neutralized with aqueous ammonia solution until the pH-value of a 20% by weight aqueous solution amounts to 7.8 to 8.5. Mixed with 22 parts phenol resol 1 (solids content 64% by weight) the resin solution represents an excellent binder for water-dilutable lacquers. The pigment carrying capacity of the binder is very good. The coating compositions containing anticorrosive pigments yield excellent corrosion resisting films after baking 20 to 30 minutes at 170 to 190° C.

Example 6

Production of the epoxy resin partial ester: 140 parts vinyl cyclohexane dioxide, 300 parts colophony (Portuguese balsamic rosin), 200 parts technical linoleic acid, 0.1 part anhydrous sodium carbonate are esterified under inert gas and toward the end of the reaction under vacuum, until the acid number has fallen below 5. 350 parts of the preliminary product a are then added and the acid number of the mixture is determined. The acid number lies usually between 120 and 130 and the viscosity measured 2:1 in n-butyl glycol according to Gardner-Holdt is G. The esterification at about 140 to 150° C. is prolonged until the acid number has dropped by about ⅓. The viscosity amounts to about J. 100 parts of this epoxy resin partial ester are mixed with 32 parts distilled water and neutralized with about 13.5 parts diisopropanol amine until the pH-value of a 20% by weight aqueous solution amounts to about 7.8.

The neutralized aqueous solution of the epoxy resin partial ester is mixed with 39 parts of the phenol resin 1 for combination. The lacquer produced of this binder requires a stoving temperature at 170° C./30 minutes. The addition of 1 to 3% by weight of a known medium promoting the flow, such as amine salts of acetic acid, relatively low-molecular polyacrylates affects the surface properties of the applied film favorably.

The aqueous coating compounds according to examples 1 through 6, non-pigmented or pigmented or provided with other suitable fillers produce very resistant coatings after stoving at 150 to 190° C. for 30 to 20 minutes. The coating compositions according to Examples 1 to 3 are especially suitable as bath solutions for the electrophoretic lacquering method.

Example 7

500 parts of an epoxy resin, which was obtained by alkaline condensation of epichlorohydrin and Bisphenol-A, having an epoxy equivalent weight of 390 to 440 and a softening temperature according to Durrans of 52–56° C., are brought to reaction with 790 parts preliminary product a at about 120° C. until the viscosity of the resin (50% strength by weight solution in n-butyl glycol) amounts to 550 to 650 cp. at 20° C.

The obtained resin is then diluted using 258 parts n-butyl glycol and 258 parts secondary butanol and 186 parts deionized water. This solution is neutralized with about 260 to 270 parts concentrated aqueous ammonia at below 50° C. until the pH-value of a 20% by weight solution in water amounts to 7.8 to 8.2.

320 parts phenol resol 1 (solids content 68% by weight) are added to this solution and the solids content is adjusted to 60% by weight using water. The viscosity of the obtained solution should be between 1500 and 3000 cp. at 20° C.

Lacquers with the binder-pigment ratio of 1:1 to 1:2, using iron oxide red for example, give coatings, after being stoved at 170° C. for 30 minutes, of a very good salt spray resistance according to ASTM 117–64, even if no anticorrosive pigments are employed such as basic lead silico chromate, for instance.

Example 8

700 parts of epoxy resin partial ester 3 (=component I) are diluted to a solids content of 70% by weight using n-butyl glycol and is then neutralized to a pH-value of 8 using aqueous ammonia.

320 parts phenol resol 1 (solids content 68% by weight) are added to this solution and the solids content is adjusted to 60% by weight using water. The viscosity of the obtained solution should be between 1500 and 3000 cp. at 20° C.

Lacquers, with the binder-pigment ratio of 1:1 to 1:2, using iron oxide red for example, give coatings, after being stoved at 170° C. for 30 minutes, of a very good salt spray resistance according to ASTM 117–64, even if no anticorrosive pigments are employed such as basic lead silico chromate, for instance.

Example 9

Production of the preliminary product b: 675 parts dehydrated castor oil and 450 parts tall oil fatty acids are reacted with 375 parts maleic anhydride in the known manner under inert gas atmosphere at 180 to 200° C. By the addition of 1.5 parts triphenylphosphite a considerable improvement concerning the color of the coatings is obtained.

As soon as the content of free maleic anhydride has fallen to below 2% by weight the reaction product is being hydrolyzed at 100° C. by adding 67 parts water over 2 hours. (Acid number is about 340.)

Production of the water-dilutable epoxy resin partial ester: 520 g. of epoxy resin being produced by condensing bisphenol A and epichlorohydrin in an alkaline medium, this product having an epoxy equivalent weight of 450 to 525 and a softening point of 65 to 75° C., are dissolved in 350 g. lauryl alcohol and 200 g. xylene.

A mixture of 20 g. lauryl alcohol and 0.5 g. of a 40% by weight strength solution of borontrifluoride in acetone is added to the above solution of the resin. It has to be refluxed for 1 hour, and then the volatile compounds are removed by distillation in vacuo at 150° C. 400 g. fatty acid adduct (preliminary product b) are added and the solution is then heated to 140° C. until the acid number of 80 has been reached. The resin is diluted to a solids content of 70% by weight.

The resin solution is then mixed with phenol carboxylic acid resol 3 in the molar ratio of 8:2 and neutralized using dimethyl ethyl amine. The thus obtained binder shows an excellent storage stability of the aqueous solution and gives coatings after electrophoretic deposition showing excellent adhesion and corrosion resistance after the stoving at 170° C. for 30 minutes.

Example 10

The instructions of Example 9 are followed but instead of 350 g. lauryl alcohol 300 g. of stearyl alcohol are employed.

350 g. fatty acid adduct (preliminary product b) are added and esterification is carried out by heating to 140° C. until the acid number of 75 has been reached. The resin is diluted to a solids content of about 80% by weight and neutralized using aqueous ammonia.

The thus obtained resin solution is then mixed with the aminoplast-forming condensation product 5 in the weight ratio of 8:2.

This binder shows very good storage stability of the aqueous solution and gives light-colored coatings after the stoving at 150° C., 30 minutes.

COMPARISON TESTS TO PROVE THE ADVANCE OVER THE PRIOR ART

Test 1

The epoxy resin partial ester 1 was produced according to this invention but the dilution was made using ethyleneglycolmonoethylether and not using ethyleneglycolmonobutylether as described in the present application. 122 parts of epoxy resin partial ester 1 were mixed with 39 parts of phenol resol 1 (solids content 65% by weight). The mixture was diluted to a solids content of 70% by weight with ethyleneglycolmonoethylether. The mixture was neutralized to a pH-value of 7.8 to 8.0 using dimethyl ethanolamine and ground with a mixture of equal parts of titanium dioxide and aluminium silicate in a way that the pigment/binder ratio had a value of 0.3:1. The pigment paste was diluted to a solids content of 12% by weight using deionized water. Zinc phosphatized sheets were coated in this electrophoresis bath to a thickness of layer of 22–26μ. The coated plates were rinsed with water and stoved at a temperature of 170° C. after a short period of drying.

Test 2

A resin was produced according to Example 7 of the U.S. Pat. 3,308,077 (Pattison). The resin was diluted in the same manner as the epoxy resin partial ester 1 of Test 1 using ethyleneglycolmonoethylether. It was also mixed with phenol resol 1 in the same ratio of amounts as described in Test 1. From this mixture an electrophoresis bath was made in the same manner as described in Test 1. In this electrophoresis bath zinc phosphatized sheets were coated with thickness of layer between 22 and 26μ which were stoved as described in Test 1.

The electrophoresis bath was stored at a temperature of 40° C. while being stirred. After 24 hours new zinc phosphatized sheets were coated. The deposition was disturbed strongly. Blister formation and dark-colored sedimentation on the film made the coatings worthless. After comparable storage at 40° C. of the electrophoresis bath made according to Test 1 unobjectionable coatings can be obtained even after 50 hours' storage.

Test 3

A resin was made according to Example 4 of the U.S. Pat. 3,355,401 (Tanner). The xylene was removed by vacuum distillation and the dilution and the mixing with the phenol resin was made as described in Test 1. Just as described in Test 1 an electrophoresis bath was prepared from the mixture whereby the dilution of the highly viscous mixture, however, did present considerable difficulties and could be carried through only under the aid of strong stirrers. Using this electrophoresis bath zinc phosphatized sheets could only be covered with a thickness of layer of about 14μ even by applying a voltage of 350 volts. The film was bursting under higher voltages. The coated sheets were stoved as described in Test 1.

Test 4

Test 3 was repeated but instead of the tricarboxylic acids described by Tanner the same amount of "preliminary product a" was used for the production of the resin. The working up and dilution of the considerably lower viscous resin mixture made no difficulties. In this electrophoresis bath zinc phosphatized sheets were coated without difficulties to a thickness of layer of 22 to 26μ.

Test 5

The plates coated according to Tests 1, 3 and 4 were subjected to the salt spray test (ASTM B 117–64) and looked at after 150 hours. The results are shown in Table 1:

TABLE 1

|  | Swell width (mm.) | Surface, 1=best value | Edge, 5=worst value |
|---|---|---|---|
| Resin of Test 1 | 2 | 1 | 1 |
| Resin of Test 3 | 6 | 5 | 5 |
| Resin of Test 4 | 3 | 1 | 1 |

From these tests the following observations can be made:

(a) According to Test 2 electrophoresis baths can be obtained using epoxy resins made as described in U.S. Pat. 3,308,077 (Pattison) which are not stable because of their high content of free maleic anhydride. The adduct produced according to Pattison contains about 15% by weight of the maleic anhydride not combined chemically according to analytical investigation.

(b) Reacting epoxy resin esters made according to U.S. Pat. 3,355,401 (Tanner) resins are obtained which can be diluted only with difficulties because of their high viscosity and which give coatings of insufficient layer thickness and subsequently of insufficient corrosion resistance when used for electrophoretic deposition (Test 5). When proceeding from the working method of Tanner to the working method of the present invention epoxy resin esters are obtained which can be diluted more easily and which give coatings of good corrosion resistance during electrophoretic deposition.

Test 6

An epoxy resin partial ester was made according to Example 4 of the U.S. Pat. 3,305,501 (Spalding). The resin was diluted in the same manner as the epoxy resin partial ester 1 of Test 1 using ethyleneglycolmonoethylether. It was also mixed with phenol resol 1 in the same ratio of amounts as described in Test 1. From this mixture an electrophoresis bath was made in the same manner as described in Test 1. In this electrophoresis bath zinc phosphated sheets were coated with a thickness of layer between 22 and 26μ and stoved as described in Test 1. The plates were subjected to the salt spray test (ASTM B–117–64) and looked at after 150 hours. The results are shown in Table 2.

TABLE 2

|  | Swell width (mm.) | Surface, 1=best value | Edge, 5=worst value |
|---|---|---|---|
| Resin of Test 6 | 12 | 4 | 5 |

Test 7

The epoxy resin partial ester 1 was made according to this invention yet instead of the "preliminary product a" the same amount of a fumaric acid adduct was brought to reaction. The reaction mixture gelled at the reaction temperature of 150° C. after 20 minutes. The fumaric acid adduct employed was made as follows: in an inert gas atmosphere a mixture of 45 parts by weight of dehydrated castor oil fatty acid and 30 parts by weight of tall oil fatty acid were made to react with 30 g. fumaric acid at a temperature of 180 to 220° C. After 34 hours the reaction mixture gave a clear solution and the content of free fumaric acid had dropped to below 2% by weight.

Conclusions (a) The epoxy resin partial ester made according to Spalding in combination with phenol resols gives coatings that do not have such good corrosion resistance as the coatings of the present invention have.

(b) Using fumaric acid adducts made of unsaturated fatty acids and fumaric acid in the molar ratio 1:1 no epoxy resin partial ester can be obtained.

Test 8

An adduct was prepared from 280 g. tall oil fatty acid and 96 g. maleic anhydride at 200° C., according to Example 6 of U.S. Pat. 3,308,077.

The content of free maleic anhydride was ascertained titrimetically in relation to the reaction time.

The following table shows these test results:

| Reaction time (hours): | Content of free MA (percent) | |
|---|---|---|
| | Test 1 | Test 2 |
| 2.5 | 15 | 16 |
| 3.0 | 9 | 8.5 |
| 3.5 | 5 | 5.5 |
| 4.0 | 3.5 | 3.3 |

Even after prolonged reaction time of 4 hours, the content of maleic anhydride still amounted to above 3%. Such a high content of acidic material induces a low storage stability to the resinous bath solution.

What is claimed is:

1. Water-dilutable heat curable coating compositions comprising the following components:
   I. hydrophilic plasticizing epoxy resin partial esters selected from the group consisting of:
      (1) the partial esters of glycidyl ethers of 2,2-bis (4-hydroxy phenyl)propane containing epoxy groups or hydroxyl groups produced by hydrolytic cleavage of said epoxy groups, with at least one monocarboxylic acid in a ratio of about 1:1 of carboxyl groups to epoxy groups and a polybasic carboxylic acid,
      (2) the partial esters of glycidyl ethers of 2,2-bis (4-hydroxy phenyl)propane containing epoxy groups or hydroxyl groups produced by hydrolytic cleavage of said epoxy groups, with polybasic carboxylic acid and
      (3) a mixture of (1) and (2),
   wherein said polybasic carboxylic acid comprises a hydrolyzed adduct or a mixture of such adducts, of maleic acid or maleic anhydride with a fatty acid in the molar proportion of 1:0.9 to 1:1.1 and said hydrolyzed adduct is esterified with the epoxy resin until the acid number has dropped by about one-third, said fatty acid is selected from the group consisting of natural drying oil acids and semi-drying oil acids, dehydrated castor oil fatty acids, tall oil fatty acids and their mixtures, tall oil fatty acid mixtures containing unsaturated monocarboxylic acids, said polybasic carboxylic acids contain no more than 3% by weight of free maleic acid and, in forming said partial esters, the molar proportion of free hydroxyl groups of the glycidyl ether to free carboxyl groups of the carboxylic acid is between 1:1 and 1:1.4, wherein one epoxy group is calculated as two hydroxyl groups,
   II. strong nitrogenous bases forming soaps with the said hydrophilic plasticizing epoxy resin partial esters,
   III. water and
   IV. 1 to 50% by weight of total solids content of water soluble or at least hydrophilic thermosetting aldehyde condensation product of low molecular weight selected from the group consisting of phenol resols, aminoplasts and their mixtures.

2. The composition of Claim 1, wherein said polybasic carboxylic acid is a hydrolyzed adduct of maleic acid or maleic anhydride and a fatty acid which has been obtained by saponification of natural drying oils or semi-drying oils.

3. The composition of Claim 1, wherein said polybasic carboxylic acid is a hydrolyzed adduct of maleic acid or maleic anhydride and a mixture of unsaturated fatty acids and rosin acids.

4. The composition of Claim 1, wherein said partial esters contain monocarboxylic acids with 1 to 40 carbon atoms.

5. The composition of Claim 4, wherein said partial esters contain monocarboxylic fatty acids with 4 to 30 carbon atoms, which were obtained by saponification of natural fats.

6. The composition of Claim 5, wherein said partial esters contain monocarboxylic acids obtained by saponification of drying or semi-drying oils.

7. The composition of Claim 6, wherein said partial esters contain monocarboxylic acids in mixture with hydro-aromatic monocarboxylic acids.

8. The composition of Claim 7, wherein said partial esters contain rosin acids as hydro-aromatic monocarboxylic acids.

9. The composition of Claim 1, wherein said aqueous coating composition additionally contains catalyzers in the form of siccatives which accelerate the drying of the film.

10. The composition of Claim 1, wherein said thermosetting, hydrophilic low molecular aldehyde condensation product is a phenol resol obtained from the reaction of formaldehyde with a substance selected from the group consisting of phenol and phenol carboxylic acids.

11. The composition of Claim 10, wherein said phenol resol is a condensation product of 4,4-bis-(4-hydroxy phenol)-valeric acid and formaldehyde.

12. The composition of Claim 1, wherein said thermosetting aldehyde condensation product contains aminoplast-forming formaldehyde condensation products.

13. The composition of Claim 12, wherein said thermosetting aldehyde condensation product is a low molecular, methanol-etherified polymethylol melamine with 4 to 6 moles formaldehyde per mole melamine.

14. The composition of Claim 1, wherein said thermosetting aldehyde condensation product is a mixture of phenolic and carboxylic acid resols and aminoplast-forming formaldehyde condensation products.

15. The composition of Claim 14, wherein the proportion of component I to the aldehyde condensation product component is 50–99 to 50–1, referred each time to solids contents in weight parts.

References Cited

UNITED STATES PATENTS

| | | | |
|---|---|---|---|
| 3,772,227 | 11/1973 | Kapalko | 260—29.2 EP |
| 3,730,926 | 5/1973 | Güldenpfennig | 260—29.2 EP |
| 3,720,648 | 3/1973 | Güldenpfennig | 260—29.3 |
| 3,671,474 | 6/1972 | Van Westrenen | 260—20 |
| 3,567,668 | 3/1971 | Güldenpfennig | 260—20 |
| 3,355,401 | 11/1967 | Tanner | 260—18 |
| 3,308,077 | 3/1967 | Pattison | 260—23 |
| 3,305,501 | 2/1967 | Spalding | 260—18 |
| 3,409,581 | 11/1968 | Hagan | 260—831 |
| 2,681,894 | 6/1954 | Hoenel | 260—842 X |
| 3,650,996 | 3/1972 | Güldenpfennig | 260—19 EP |

DONALD E. CZAJA, Primary Examiner

C. W. IVY, Assistant Examiner

U.S. Cl. X.R.

204—181; 260—20, 21, 29.2 EP, 29.3, 29.4 R